United States Patent [19]

Yang

[11] 4,276,012
[45] Jun. 30, 1981

[54] MOLD ISOLATOR MECHANISM FOR CENTRIFUGAL CASTING MACHINE

[75] Inventor: James H. C. Yang, Cleveland, Ohio

[73] Assignee: The Firestone Tire & Rubber Company, Akron, Ohio

[21] Appl. No.: 128,002

[22] Filed: Mar. 7, 1980

[51] Int. Cl.³ ............................................. B29C 5/04
[52] U.S. Cl. ................................... 425/435; 425/35; 425/211
[58] Field of Search .................... 425/35, 49, 435, 211

[56] References Cited

U.S. PATENT DOCUMENTS

| | | | |
|---|---|---|---|
| 3,611,506 | 10/1971 | Schroeder | 425/425 |
| 3,918,864 | 11/1975 | Braun | 425/129 |
| 3,924,982 | 12/1975 | Yang | 425/35 |
| 4,035,118 | 7/1977 | MacMillan | 425/25 |
| 4,083,672 | 4/1978 | Vaishnav | 425/35 |
| 4,133,622 | 1/1979 | Braun | 425/129 |

FOREIGN PATENT DOCUMENTS 145453  2/1952  Australia ..................... 425/435

Primary Examiner—James H. Derrington

[57] ABSTRACT

A centrifugal casting machine (20) has a first rotatable shaft (33) and a second rotatable shaft (45) as well as a rotatable core member (100) having a central opening, with at least one of these shafts being adapted for reciprocal movement so as to extend into the core member central opening and adjacent to the other one of the shafts (33) and (45). First (73) and second (83) mold halves are located on opposite sides of the core member (100) and each is adapted to move inwardly and outwardly between open and closed positions. The mold halves (73) and (83) are rotatably supported on bearing means (75) and (85) and in closed position are adapted to rotate with the core member (100) and define a cavity (128) in combination therewith. The improvement takes the form of the addition of mold isolator means (130) and (132) between the bearing means (75) and (85) and the mold halves (73) and (83). The isolator mechanisms (130) and (132) serve simultaneously as torque couplings, clamping force transmitters, misalignment adjusters, vibration dampers and thermal expansion providers.

12 Claims, 7 Drawing Figures

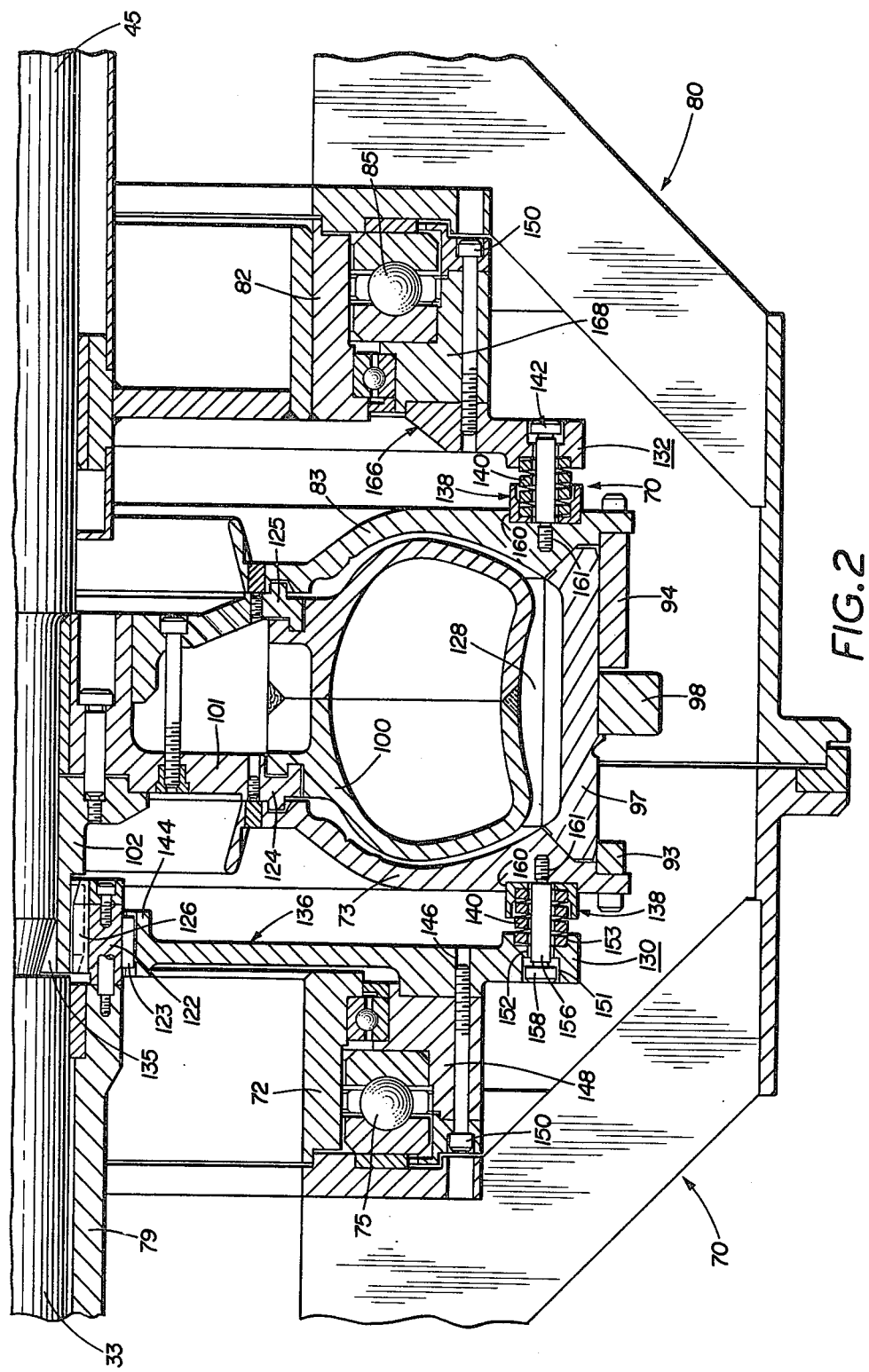

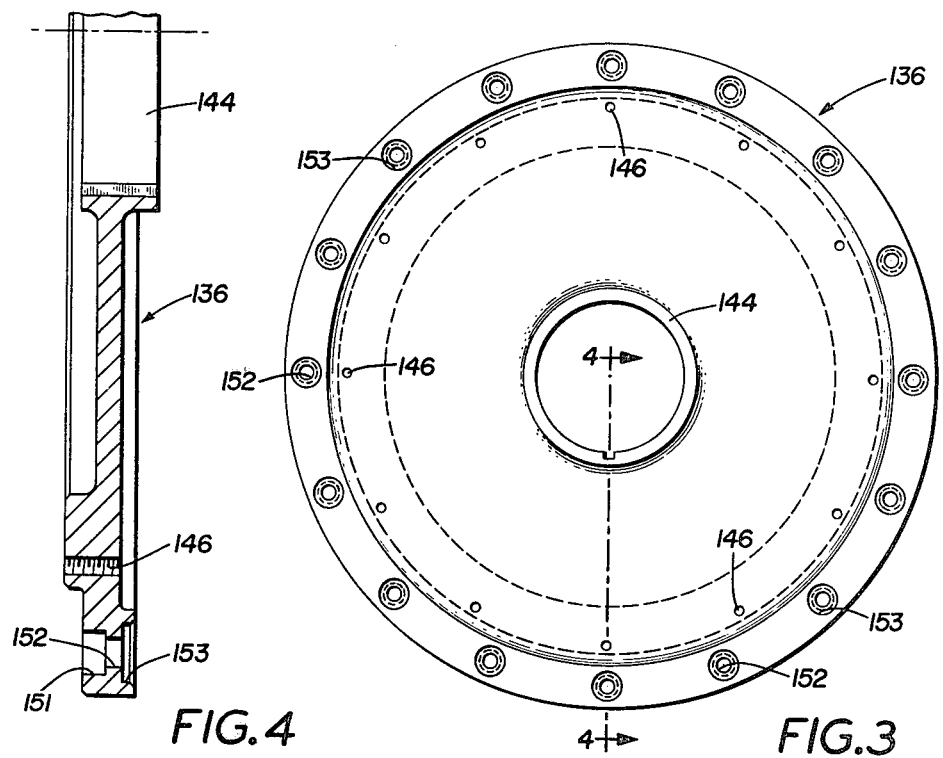
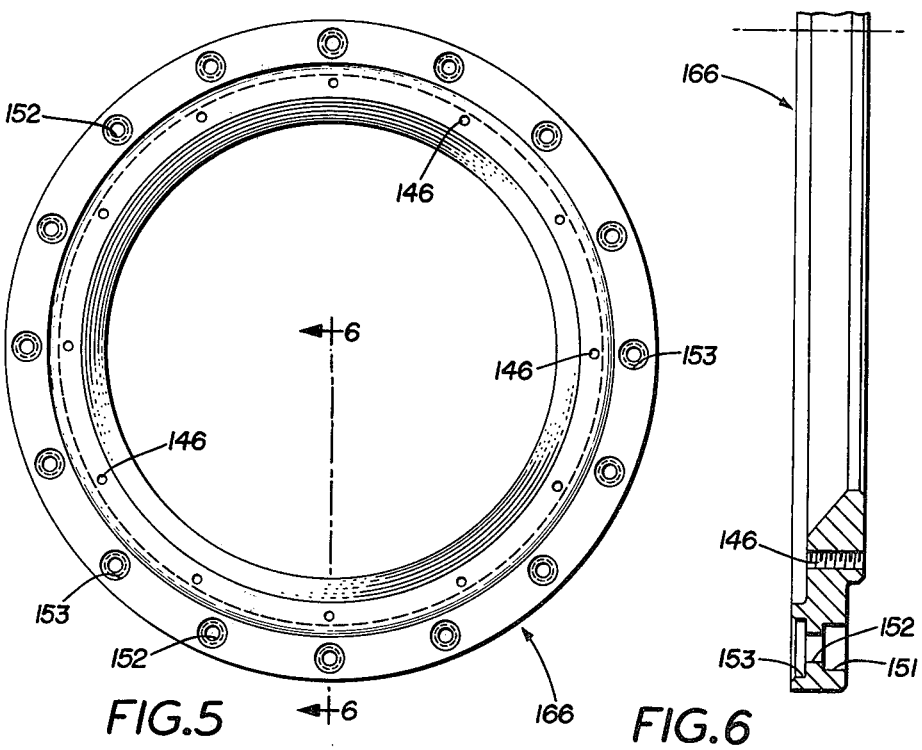

MOLD ISOLATOR MECHANISM FOR CENTRIFUGAL CASTING MACHINE

TECHNICAL FIELD

The field of art to which this invention pertains is that of centrifugal casting machines and more particularly to centrifugal tire casting machines.

The apparatus generally used in the centrifugal casting of vehicle tires usually comprises a core, tread ring and two outer shells or mold halves which are normally made of metal and must be quite accurately machined. Once the parts are assembled, the entire assembly is normally connected to a rotating shaft for rotation of the assembly at the desired molding speed and an elastomeric substance, such as polyurethane, is introduced in the mold cavity that is formed between the core and the mold halves. The assembly, after production of the tire, is then disassembled in order to remove the completed tire from the apparatus.

The present invention represents an improvement over the centrifugal casting machine shown and claimed in prior U.S. Pat. No. 3,924,982 which is also assigned to the assignee of the present invention. This machine is comprised of inboard and outboard assemblies which may be mounted on a common base or frame. An inboard shaft, rotatably driven by a suitable drive motor, provides the rotative power for rotating the entire assembly. An outboard shaft is adapted to move axially through a central opening in the core and into driving engagement with the end of the inboard shaft to secure the core in position and provide means for rotative support of the same. Two mold halves are respectively formed as part of the inboard and outboard assemblies. These mold halves open and close in an axial direction by means of hydraulic actuation, which serves to keep the core and tread ring in place during centrifugal casting and, also, provides a quick means of mold disassembly after completion of the casting process. This apparatus is capable of centrifugally casting a vehicle tire by means of semi-automatic or fully-automatic operation.

The apparatus described in U.S. Pat. No. 3,924,982 thus utilizes basically four independent supports, namely, the drive and idler shafts as well as the axially and rotatably moveable mold halves. Naturally, since the parts must be assembled and disassembled and some must be capable of rotation, clearances are required and tolerance stackups do occur. In addition, since an average mold may weigh on the order of 200 kilograms or more, the mold components make it rather unwieldy. Furthermore, since dissimilar metals are often utilized in the mold construction there are different coefficients of thermal expansions that can cause difficulties.

As result of the large rotating masses and the multiple supports, as previously noted, some vibration is unavoidable. In this prior art construction, the item being cast, i.e., the tire itself, basically served as the isolator structure between the mold and the several machine parts. Furthermore, machine vibrations or misalignments of rotating parts, in addition to effecting and exciting the mold parts and causing adverse effect on tire quality also caused premature mold and machine wear.

BACKGROUND ART

U.S. Pat. No. 4,133,622 to Braun discloses a mold that is mounted on bearings and has pins and springs to support the mold halves. These rods or pins act as guides for the mold halves and the springs urge the mold halves toward each other. This reference teaches the urging of the mold halves toward each other but appears to permit no rotational adjustment. U.S. Pat. No. 3,918,864, also to Braun, discloses a mold wherein springs serve to hold the mold in closed position.

U.S. Pat. No. 3,611,605 to Schroeder pertains to a rotating casting device wherein a mold half is guided by pins, each of which contain a spring that exerts sufficient force on the mold half to prevent parting line flash and at the same time permit expansion and contraction due to heating and cooling independent of the spiders which support the mold.

U.S. Pat. No. 4,035,118 to MacMillan discloses a tire mold and though not of centrifugal casting type, it nevertheless shows, in FIGS. 11 and 12, but does not describe with any particularity, springs and pins to support the opposing matrices.

DISCLOSURE OF THE INVENTION

The present invention provides an improvement over the previously-discussed centrifugal casting machine via the interposition of isolator means between the mold halves and the bearing structures that rotatably support the mold halves.

Each of the mold isolator mechanisms basically takes the form of pluralities of elastic absorber elements that are interposed between an outer retainer element that is secured for rotation with one of the mold half bearing assemblies and one of the mold halves. Preferably the isolator mechanism also includes pluralities of inner retainer elements that are located relative to one of the mold halves so that the elastic absorber elements are interposed between the inner and outer retainer elements. In addition, the isolator mechanism preferably also includes pluralities of rigid connector elements that are affixed to either the outer retainer element or the mold half so as to permit axial movement relative to one of these members. The elastic absorber elements themselves preferably take the form of compression springs but are not limited thereto.

The use of the mold isolator mechanisms of the present invention permit a limited amount of both axial and angular movement of the supported mold half relative to a rotatable portion of the associated mold assembly.

In the open position, the rigid connector elements limit the expansion of the elastic absorber elements. Upon closing of the mold assemblies, the elastic absorber elements are under compression so as to permit some axial relative movement between the mold half and its support structure. In addition, the tolerances between the elastic absorber elements and the rigid connectors are such that there can be a limited amount of rotational or indexing movement of the mold half relative to its support structure.

The use of the inboard and outboard mold isolator means between the inboard and outboard mold halves and their respective support structures permits the isolator mechanisms to serve as torque couplings between the mold halves and the remainder of the machine. Since only frictional forces are utilized to hold the mold components together, the mold isolator mechanisms also serve as clamping force transmitters wherein the mold halves are biased against the peripheral ring member. Furthermore, the energy absorbant characteristics of the elastic absorber elements dampen machine vibration and at the same time permit the unavoidable movement due to differential thermal expansion of the several mold parts.

The use of the mold isolator mechanisms of the present invention eliminate the adverse effects on product quality caused by unforseeable machine vibration or misalignment of the rotating parts which tend to effect and excite the several mold parts.

One preferred embodiment is shown by way of example in the accompanying drawings and described in detail without attempting to show all of the various forms or modifications in which the invention might be embodied. The features and advantages of the invention will become more readily understood by persons skilled in the art when following the best mode description in conjunction with the several drawings.

BRIEF DESCRIPTION OF THE DRAWINGS

FIG. 2. is an enlarged and simplified sectional view of the lower half of the central portion of the machine shown in FIG. 1.

FIG. 3 is a plan view of one of the spring plates used in the present invention.

FIG. 4 is an enlarged sectional view taken along line 4—4 of FIG. 3.

FIG. 5 is a plan view of another of the spring plates of the present invention.

FIG. 6 is an enlarged sectional view taken generally along line 6—6 of FIG. 5.

BEST MODE FOR CARRYING OUT THE INVENTION

As previously noted, the mold isolator mechanism of this invention represents an improvement over the centrifugal casting machine shown and claimed in U.S. Pat. No. 3,924,982. The structure and operation of this machine can be fully understood by persons skilled in this art by reference to the disclosure of said patent which is incorporated herein by reference to the extent necessary to explain known practices in this art. In order to permit ready comparison with U.S. Pat. No. 3,924,982, like numerals are used in this description wherever possible.

Figure 1:
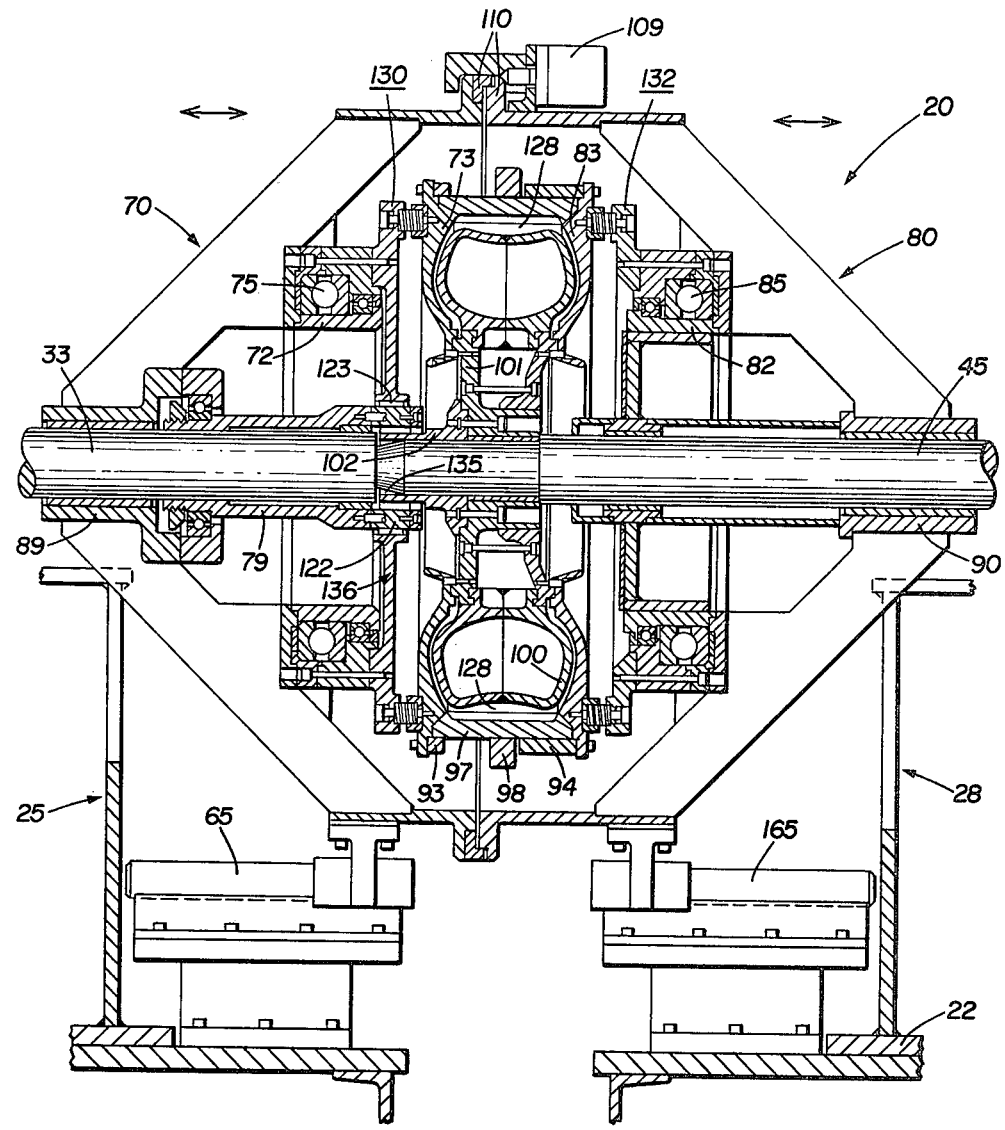
FIG. 1 is a sectional view of the central portion of a centrifugal casting machine which includes the mold isolator mechanism of the present invention.

Referring now to the drawings, specifically FIG. 1, there is illustrated a sectional view of the central portion of a centrifugal casting machine 20 having a base or frame 22 mounted in a floor or other suitable structure. Inboard and outboard housings 25 and 28, respectively, are supported by base 22. A drive shaft 33 is rotatably supported relative to housing 25 in a fixed axial position and motor power means are provided to rotate the shaft.

An idler shaft 45 is rotatably as well as axially moveable relative to outboard housing 28. The adjacent inner ends of drive shaft 33 and idler shaft 45 are provided with any desired type of axially engaging drive connecting means 135 that permits the rotational interconnection of the two shafts while also permitting axial disengagement. It will thus be understood that drive shaft 33 is mounted in a fixed axial position and is adapted for rotation, with idler shaft 45 being adapted to be moved axially in and out of engagement with drive shaft 33 and also being capable of rotative movement.

A plurality of horizontally extending guide rods, including guide rod 65, are provided on inboard housing 25 whereas an additional plurality of horizontally extending guide rods, including guide rod 165 are provided on outboard housing 28. The purpose of these guide rods on housing 25 is to support an inboard mold assembly 70 whereas the guide rods on housing 28 support an outboard mold assembly 80 thereby permitting these two assemblies to move back and forth or reciprocate between a closed position and an open position in the manner set forth in U.S. Pat. No. 3,924,982. The reciprocal movement of mold assemblies 70 and 80, in addition to being supported by the several guide rods, is also supported by axial sliding movement of bearing sleeves 89 and 90 which respectively slide on drive shaft 33 and idler shaft 45. Sleeve 89 is connected to and reciprocates axially with inboard mold assembly 70 and permits rotation of drive shaft 33 with respect thereto since it is not rotatably connected thereto.

Inboard mold assembly 70 includes a nonrotatable member 72 that is connected to a rotatable first or inboard mold half 73 via bearing means 75 and first or inboard mold isolator means 130 which will be described in more detail hereinafter. As noted in U.S. Pat. No. 3,924,982, several hydraulic piston and cylinder means are utilized to reciprocate inboard mold assembly 70 back and forth between its closed and open positions.

The outboard mold assembly 80, in like manner, is reciprocable between its inner closed and outer open positions and includes a nonrotatable member 82 connected to a rotatable second or outboard mold half 83 via bearing means 85 and second or ouboard mold isolator means 132 which will also be described in more detail hereinafter. Similarly, additional piston and cylinder means are mounted for reciprocating outboard mold assembly 80 between its open and closed positions.

First mold half or inboard outer shell 73 is provided with a circumferentially extending guide ring 93 and second mold half or outboard outer half 83 is provided with a circumferentially extending guide ring 94. These guide rings are suitably fixedly mounted in position preferably by bolts or other securing means. The purpose of guide rings 93 and 94 is to support a tread ring 97, which is usually constructed of two or more segments secured about their peripheral extent by means of a retainer ring 98. Tread ring 97 is located simply by fitting against the inner peripheral surface of guide rings 93 and 94 and against corresponding mating surfaces on mold halves 73 and 83. In the open position, tread ring 97 is carried by outboard mold half 83, via guide ring 94, and as the two mold halves come together, tread ring 97 merely moves under guide ring 93 and into engagement with inboard mold half 73.

The mold assembly also includes a core 100 which may be made up of a plurality of arcuate segments, with core 100 being located between first and second mold halves 73 and 83 and defining in combination with tread ring 97 and the mold halves, a tire cavity 128. Core 100 includes a hub member 101 and a hub extension 102, which serve to both properly locate and support core 100 relative to idler shaft 45. Several circumferentially spaced core hub portions 124 and 125 serve to locate the inner ends of mold halves 73 and 83 respectively, relative to core 100. A drive sleeve 79 is rotatably secured to drive shaft 33 by means of a key and a keyway construction (not shown), which enables sleeve 79 to be moved axially with respect to drive shaft 33, with the keyway being of sufficient length to accommodate the required axial movement of sleeve 79 between the open and closed position of mold assembly 70. The inner axial end of drive sleeve 79 is provided with an annular extension member 122, whose inner peripheral surface is provided with any desired type of axially engaging drive connecting means 126 that permits rotational and axial inter-connection with hub extension 102. This in turn permits the rotation of core 100. A rotary air clamp 109 is adapted to lock mold assemblies 70 and 80 together by means of engaging flanges 110 on the two assemblies.

As best shown in FIG. 2, first or inboard mold isolator means 130 is comprised of spring plate or outer retainer element 136 and pluralities of spring covers or inner retainer elements 138, springs or elastic absorber elements 140 and shoulder screws or rigid connectors 142. Spring plate or disc 136, as best detailed in FIGS. 3 and 4, has its hub portion 144 surrounding sleeve extension member 122 (FIGS. 1,2) and is affixed thereto for rotation therewith via key 123. Spring plate 136 is also provided with a plurality of circumferentially spaced threaded bores 146 that permit attachment to rotatable portion 148 of mold assembly 70 via bolts 150. The rim portion of spring plate 136 is provided with a plurality of stepped bores 151, 152 and 153, with through bore 152 permitting the loose passage of shank portion 156 of shoulder screw 142 therethrough. Bore 151 forms part of a cylindrical cavity which loosely receives head portion 158 of shoulder screw 142. Inboard mold outer shell 73 is provided with a plurality of circumferentially spaced concentric bores 160, 161 wherein the latter is threaded and receives threaded portion 163 of shoulder screw 142. Bores 160 serve to receive the apertured lower or bottom portion 164 of generally cup-shaped spring cover 138. Spring cover 138 serves to retain one end of spring 140, with the other end of spring 140 being received within bore 153 of spring plate 136. As best seen in FIG. 2, spring 140 loosely envelopes screw shank portion 156, with spring 140 thus serving to couple inboard mold half 73 with spring plate 136.

It should be noted that when mold assemblies 70 and 80 are closed, as in FIG. 2, springs 140 are under compression as evidenced by bolt head portion 158 being spaced from the inner end of cavity 151, thereby permitting some axial relative movement between mold half 73 and spring plate 136. In addition, the inside diameter of spring 140 and the diameter of bore 152 are somewhat larger than the outside diameter of screw shank portion 156 thereby permitting a limited amount of rotational or indexing movement of mold half 73 relative to spring plate 136. Basically, it should be understood that a plurality of springs 140 are utilized for connecting mold half 73 with rotatable portion 148 of mold assembly 70.

Figure 7:
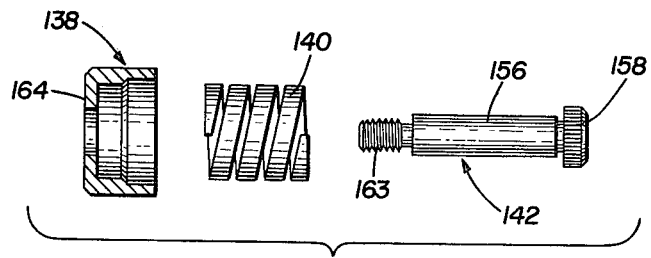
FIG. 7 is an exploded view of one of the assemblies utilized in the present invention.

Turning now to second or outboard mold isolator means 132, it utilizes the identical spring cover 138, spring 140 and shoulder screw 142 shown as assembly 170 in FIG. 7 and previously discussed with reference to inboard mold isolator means 130. Spring plate or disc 166 of isolator means 132 and as best shown in FIGS. 5 and 6 is substantially similar to spring plate 136 with the exception of the deletion of hub portion 144 of the latter. Therefore, like portions thereof are provided with like numerals. Spring plate 166 is physically attached to rotatable portion 168 of outboard mold assembly 80, via bolts 150, for rotation therewith. In a similar manner, apertured bottom portions 164 of spring covers 138 are received in bores 160 in outboard mold half 83 and threaded screw portions 163 are received in threaded bore portions 161 of mold half 83.

The use of spring covers 138 is not mandatory, since bores 160 could be constructed similar to bores 153 in plates 136 for retaining the inner ends of springs 140. Spring covers 138 do, however, guide the spring ends and also serve to protect springs 140 from the sometimes hostile environment. If desired, telescoping or flexible sleeves can be used to loosely envelope elastic absorber elements 140, which in addition to the disclosed springs can take many other forms such as viscoelastic member or fluid-pressure devices, such as hydraulic or pneumatic shock absorbers. Rigid connectors 142 serve to limit the expansion of elements 140 in the open positions of mold assemblies 70 and 80.

It should be clear at this time that core 100 is rotatably driven by sleeve 79 via drive connecting means 126 on sleeve extension member 122, with the latter also driving inboard mold isolator means 130 via key 123 and outer retainer element 136. As previously noted, several circumferentially spaced core hub portions 124 and 125 serve to locate the inner ends of mold halves 73 and 83, respectively, relative to core 100 when the mold assembly is fully closed. In the open position of the mold assembly, outer shells 73 and 83 are carried by mold isolator means 130 and 132 respectively.

It should also be noted that outboard mold isolator means 132 is not directly driven by either of shafts 33 and 45 but rather is frictionally driven or rotated via the torque transfer, upon the closing of the mold assembly, from inboard mold half outer shell 73 through peripheral ring 97 to outboard mold half outer shell 83, which in turn reacts against outer retainer element 166 via the compression of absorber elements 140 of second isolator means 132. Therefore, the torque for rotating outboard mold half outer shell 83 is transferred from inboard mold isolator means 130 to outboard mold isolator means 132 via ring 97 and the multiples of elastic absorber elements 140 utilized in the two isolator means.

Isolator means 130 and 132, interposed between inboard mold half 73 and outboard mold half 83 and bearing means 75 and 85, respectively, serve a plurality of useful functions. First of all, the isolators serve as torque couplings between the mold halves and the casting machine. Secondly, mold isolator means 130 and 132 isolate or at least reduce both axial and rotational (angular) misalignment between the mold halves. Furthermore, the isolator means of the present invention act as vibration absorbers and also permit differential thermal expansion of the mold parts. Finally, isolator means 130 and 132 also enable each mold half to rotate as well as to move axially so as to permit opening and closing of the mold assembly. All of these enumerated benefits permit the production of quality end products while at the same time increasing both mold and machine life.

From the foregoing description, and the operational discussion, it is believed that those familiar with the art will readily recognize and appreciate the novel concepts and features of the present invention. Obviously, while the invention has been described in relation to only one embodiment, numerous variations, changes, substitutions and equivalents will present themselves to persons skilled in the art and may be made without necessarily departing from the scope and principles of this invention. For example, the use of the isolator means of the present invention is not limited to centrifugal tire casting machines but may be utilized with all types of centrifugal casting machines. As a result, the embodiment described herein is subject to various modifications, changes and the like, without departing from the spirit and scope of the invention, with the latter being determined solely by reference to the claims appended hereto.

What is claimed is:

1. A centrifugal casting machine of the type having a first rotatable shaft, a second rotatable shaft, a rotatable core member having an opening, at least one of said first and second shafts being adapted for moving toward and away from the other so as to extend in the opening in said core member and adjacent the other of said first and second shafts to rotatably support said core member, a first and a second mold half located on opposite sides of said core member and each adapted to move inwardly and outwardly between open and closed positions, said mold halves being rotatably supported on bearing means and in closed position being adapted to rotate with said core member and, also, defining a cavity in combination therewith, wherein the improvement comprises the addition of pluralities of mold isolator and elastic coupling means between said bearing means and said mold halves, serving concurrently as torque couplings, clamping force transmitters, rotational misalignment adjusters, and vibration dampers.

2. The improved centrifugal casting machine of claim 1 wherein each of said mold isolator and elastic coupling means includes an outer retainer element secured for rotation with one of said bearing means; and pluralities of elastic absorber elements interposed between said outer retainer element and one of said mold halves.

3. The improved centrifugal casting machine of claim 2 wherein each of said mold isolator and elastic coupling means further includes pluralities of inner retainer elements located relative to one of said mold halves, with said elastic absorber elements being interposed between said inner and outer retainer elements.

4. The improved centrifugal casting machine of claim 2 or 3 wherein said elastic absorber elements take the form of compression springs.

5. The improved centrifugal casting machine of claim 3 wherein each of said mold isolator and elastic coupling means further includes rigid connector elements affixed to one and axially moveable relative to the other of one of said mold halves and said outer retainer element.

6. The improved centrifugal casting machine of claim 5 wherein said connector elements are coaxial with said elastic absorber elements.

7. The improved centrifugal casting machine of claim 1 wherein at least one of said mold isolator and elastic coupling means is operatively connected with one of said shafts.

8. A centrifugal casting machine of the type having first and second rotatable shafts, a rotatable core member having a central opening with at least one of said shafts being adapted for reciprocating relative to the other so as to extend in said core member central opening and adjacent to the other of said shafts to rotatably support said core member, first and second mold halves located on opposite sides of said core member and each adapted to reciprocate between open and closed positions, said mold halves being rotatably supported on bearing means and in closed position being adapted to rotate with said core member and also defining a mold cavity in combination therewith, characterized by the addition of pluralities of mold isolator and elastic coupling mechanisms between said bearing means and said mold halves, said mechanisms simultaneously serving as clamping force transmitters, torque couplings, vibration dampers and angular misalignment adjusters.

9. The improved centrifugal casting machine of claim 8 wherein each of said mold isolator and elastic coupling mechanisms includes an outer retainer element secured for rotation with one of said bearing means; pluralities of inner retainer elements located relative to one of said mold halves; pluralities of elastic absorber elements interposed between said inner and outer retainer elements; and rigid connector elements affixed to one and axially moveable relative to the other of said mold halves and said outer retainer element.

10. The improved centrifugal casting machine of claim 9 wherein said connector elements are coaxial with said elastic absorber elements.

11. The improved centrifugal casting machine of claims 9 or 10 wherein said elastic absorber elements take the form of compression springs.

12. A centrifugal tire casting machine of the type having first and second rotatable shafts, a rotatable core member having a central opening, at least one of said shafts being adapted for moving toward and away from the other so as to extend in said core member central opening and adjacent the other of said shafts to rotatably support said core member, first and second mold halves located on opposite sides of said core member and each adapted to reciprocate between open and closed positions, said mold halves being rotatably supported on bearing means and in closed position being adapted to rotate with the core member and, also, defining a mold cavity in combination therewith, wherein the improvement comprises the addition of pluralities of elastic coupling and absorber elements between said bearing means and said mold halves, wherein said elastic coupling and absorber elements serve the concomitant functions of torque couplings, clamping force transmitters, rotational misalignment adjusters and vibration dampers.

* * * * *